US008423185B2

(12) United States Patent
Sakaguchi et al.

(10) Patent No.: US 8,423,185 B2
(45) Date of Patent: Apr. 16, 2013

(54) ROBOT SYSTEM (75) Inventors: Seishiro Sakaguchi, Kitakyushu (JP); Toshiaki Iimori, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 854 days.

(21) Appl. No.: 12/537,262

(22) Filed: Aug. 7, 2009

(65) Prior Publication Data
US 2010/0125363 A1 May 20, 2010

(30) Foreign Application Priority Data

Nov. 17, 2008 (JP) ................................. 2008-293278

(51) Int. Cl.
*G05B 19/418* (2006.01)
(52) U.S. Cl.
USPC ................................. 700/248; 700/264; 901/3
(58) Field of Classification Search .................... 700/248
See application file for complete search history.

(56) References Cited

U.S. PATENT DOCUMENTS

| 5,889,924 | A | * | 3/1999 | Okabayashi et al. ......... 700/245 |
| 7,010,755 | B2 | * | 3/2006 | Anderson et al. ............. 715/778 |
| 7,783,387 | B2 | * | 8/2010 | Calcagno ...................... 700/264 |
| 8,185,846 | B2 | * | 5/2012 | Kuwahara et al. ............ 715/866 |
| 2005/0119770 | A1 | * | 6/2005 | Park et al. ........................ 700/65 |
| 2008/0009973 | A1 | * | 1/2008 | Matsuo et al. ................. 700/246 |
| 2008/0301729 | A1 | * | 12/2008 | Broos et al. ...................... 725/38 |
| 2009/0299524 | A1 | * | 12/2009 | Evans et al. ................... 700/248 |
| 2010/0161123 | A1 | * | 6/2010 | Ando et al. .................... 700/248 |

FOREIGN PATENT DOCUMENTS

| JP | 05-346811 | 12/1993 |
| JP | 07-276274 | 10/1995 |
| JP | 2005-219196 | 8/2005 |
| JP | 2005-219332 | 8/2005 |
| JP | 2008-197856 | 8/2008 |
| WO | WO 2006/100940 | 9/2006 |

OTHER PUBLICATIONS

Janome Desktop Robot JR2000N Series Operation Manual, Jul. 27, 2007.*
Japanese Office Action for corresponding JP Application No. 2008-293278, Aug. 21, 2012.

* cited by examiner

*Primary Examiner* — Khoi Tran
*Assistant Examiner* — Ryan Rink
(74) *Attorney, Agent, or Firm* — Ditthavong Mori & Steiner, P.C.

(57) ABSTRACT

A robot system includes a robot control device connected to a plurality of robots each having a plurality of joints and a robot teaching device configured to communicate with the robot control device so as to teach and operate the robots. The robot control device automatically select one of the robots to be operated in accordance with a change in a display state of a display of the robot teaching device.

11 Claims, 7 Drawing Sheets

| AA | R1 |
|---|---|
| | X xxx.xx mm |
| | Y xxx.xx mm |
| | Z xxx.xx mm |

Fig. 3B

| AA | BB |
|---|---|
| R1 | R2 |
| X xxx.xx mm | X xxx.xx mm |
| Y xxx.xx mm | Y xxx.xx mm |
| CC | DD |
| R3 | E1 |
| X xxx.xx mm | X xxx.xx mm |
| Y xxx.xx mm | Y xxx.xx mm |

REQUEST CONTROL GROUP CHANGE

ROBOT SYSTEM

CROSS REFERENCES TO RELATED APPLICATIONS

The present application is related to Japanese Patent application no. 2008-293278 filed at Japan Patent Office titled "Robot System", all of which are incorporated herein by reference.

BACKGROUND OF THE INVENTION

1. Field of the Invention

The present invention relates to a robot system in which a robot carries out operation.

2. Discussion of the Background

A robot system in the related art includes a robot having a plurality of joints (multi-joint robot), a robot control device configured to control the robot, and a robot teaching device connected to the robot control device and configured to teach and operate the multi-joint robot. Among the above devices, the robot teaching device has a display device for displaying and editing an operation program of the robot and various kinds of parameters. Such displayed data can be operated and edited on the screen of the display device.

The robot control device supplies data stored in a memory included therein to the robot teaching device. The robot teaching device displays the data on the display device.

Such a robot teaching device is disclosed, for example, in Japanese Unexamined Patent Application Publication No. 2005-219196 and Japanese Unexamined Patent Application Publication No. 07-276274.

In a case where a robot system includes a plurality of robots and external axes (called a control group hereafter) connected to a robot control device and is operated by one robot teaching device, one of the robots to be operated needs to be selected and changed by a key operation and a touch panel operation on the robot teaching device.

A screen displayed on the display device of the robot teaching device needs to have a function of automatically changing the robot to be operated according to displayed content.

In robot systems of the related art, there is such a case that the control of one robot is only taken into account or the robot system including only one robot teaching device is not taken into account. Moreover, a case where a plurality of screens is displayed is not taken into account. In such cases, a control group associated with a screen by an operator may possibly be different from a control group to be operated by the robot control device. Thus, if the operator operates a control group, a problem may occur that a control group that the operator does not intend to operate works and the intended control group does not work.

SUMMARY OF THE INVENTION

Accordingly, the present invention provides a robot system including a robot teaching device that operates an object to be operated even in a case where one robot teaching device operates a plurality of control groups.

According to one aspect of the present invention, a robot system includes a plurality of robots each having a plurality of joints, a robot control device connected to the plurality of robots and a robot teaching device configured to communicate with the robot control device so as to teach and operate the robots. The robot control device automatically selects one of the robots to be operated in accordance with a change in a display state of a display of the robot teaching device.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Embodiments will now be described with reference to the accompanying drawings, wherein like reference numerals designate corresponding or identical elements throughout the various drawings.

Figure 1:
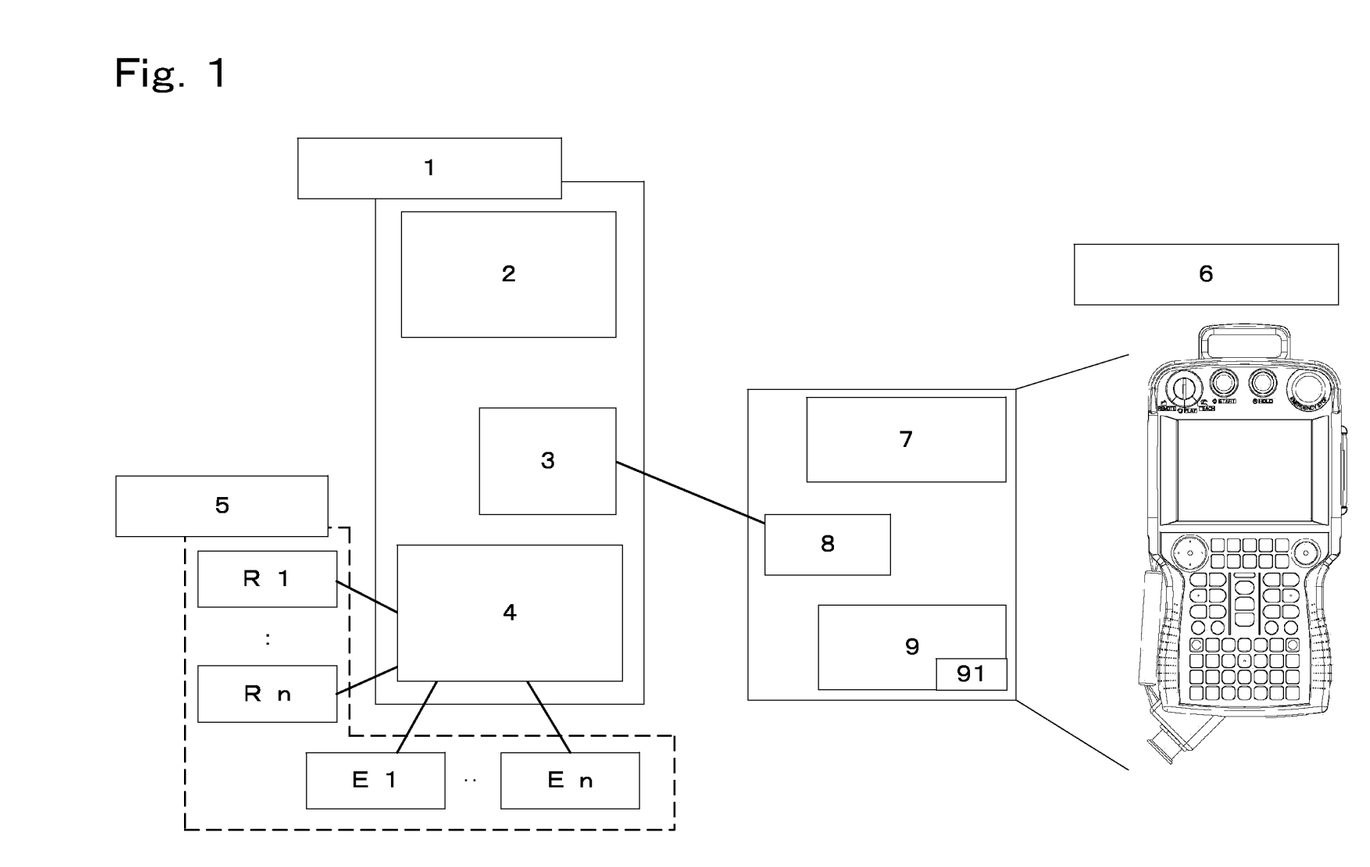
FIG. 1 is a block diagram of a robot system according to an embodiment of the present invention.

FIG. 1 shows a block diagram of an embodiment of the present invention. In FIG. 1, a robot control device 1 is connected to a robot teaching device 6 through a communication cable. Meanwhile, a plurality of control groups 5, each of which includes a plurality of robots R and a plurality of external axes E, is connected to the robot control device 1 through other cables.

The robot control device 1 includes a control unit 2 configured to control the whole operation of the system, a communication unit 3 configured to communicate with the robot teaching device 6, and a drive unit 4 configured to supply power necessary for operating the robots.

The robot teaching device 6 includes a communication unit 8 configured to communicate with the robot control device 1, a display 7 having a touch panel function for displaying various kinds of data, and a keypad 9 for key operations.

The robot control device 1 and the robot teaching device 6 communicate with each other through the communication units 3 and 8 connected to the robot control device 1 and the robot teaching device 6, respectively. The robot control device 1 produces data to be displayed on a screen of the display 7 and supplies the data to the robot teaching device 6 via the communication units 3 and 8. The robot teaching device 6 produces content of the received data and displays the content on the screen. If a key of the keypad 9 of the robot teaching device 6 is pressed, the robot teaching device 6 informs the robot control device 1 which key has been pressed. If the touch panel is operated, the robot teaching device 6 detects which portion has been touched on the screen and supplies an operation request corresponding to the touched portion to the robot control device 1.

Figure 2:
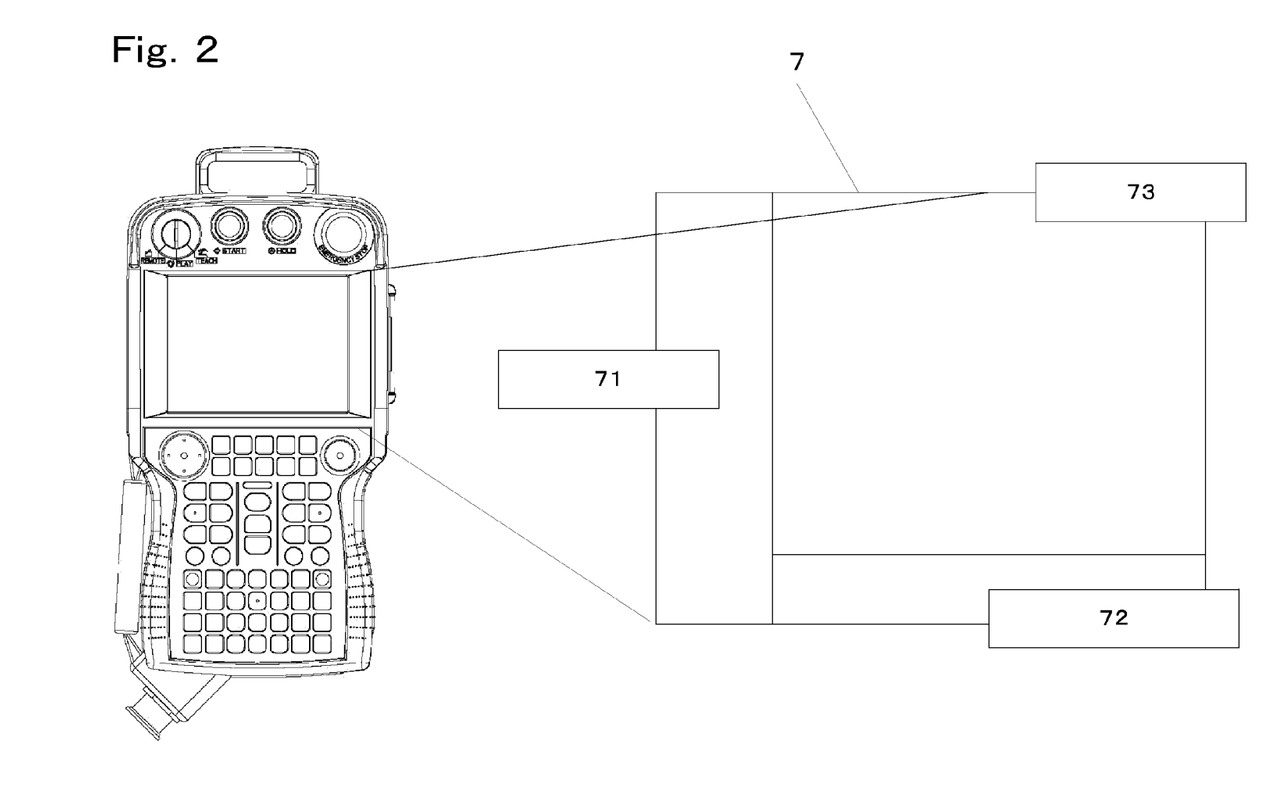
FIG. 2 is a diagram of a display according to an embodiment of the present invention.

FIG. 2 shows an example of classification of areas displayed on the display 7 of the robot teaching device 6. The content displayed on the display 7 is composed of three areas, which are a menu area 71, a message area 72 and an all-purpose area 73. In the menu area 71, functions such as a robot operation, a working menu, a system setting and a screen setting necessary for teaching a robot are classified and displayed according to the respective categories. If the operator selects one of the categories, a list of functions belonging to that category is displayed in the menu area 71. If the operator selects one of the functions that the operator wants to display, a screen corresponding to that function is displayed in the all-purpose area 73.

In the message area 72, a message for attracting the operator's attention or explaining operation conditions is displayed in accordance with the condition of the robot teaching device 6. If, for example, the operator tries to put the robot into operation without turning on the servo power supply of the control group, a message such as "turn power supply on" is displayed.

Figure 3A:
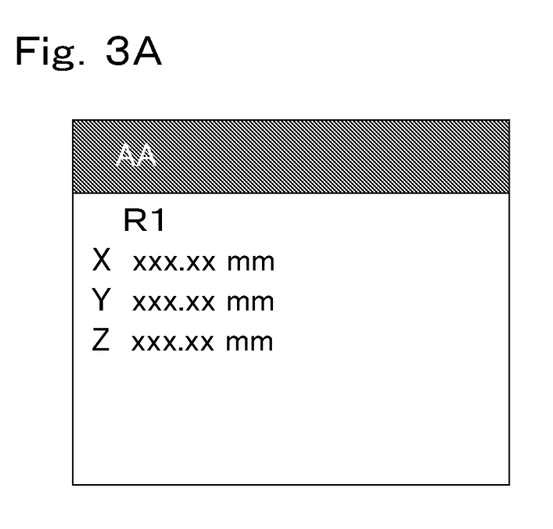
FIG. 3A shows an all-purpose area in an undivided mode according to an embodiment of the present invention.
Figure 3B:
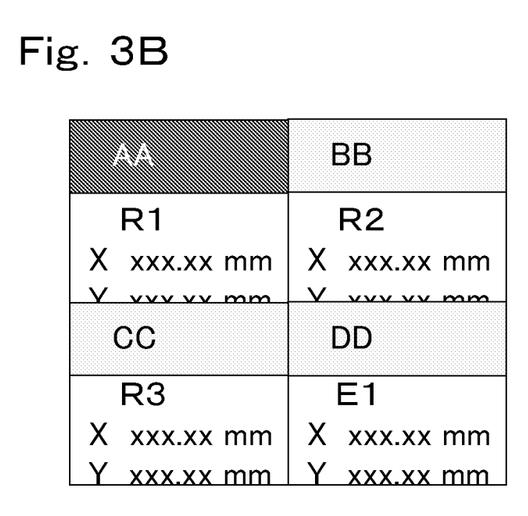
FIG. 3B shows an all-purpose area in a divided mode according to an embodiment of the present invention.
Figure 4:
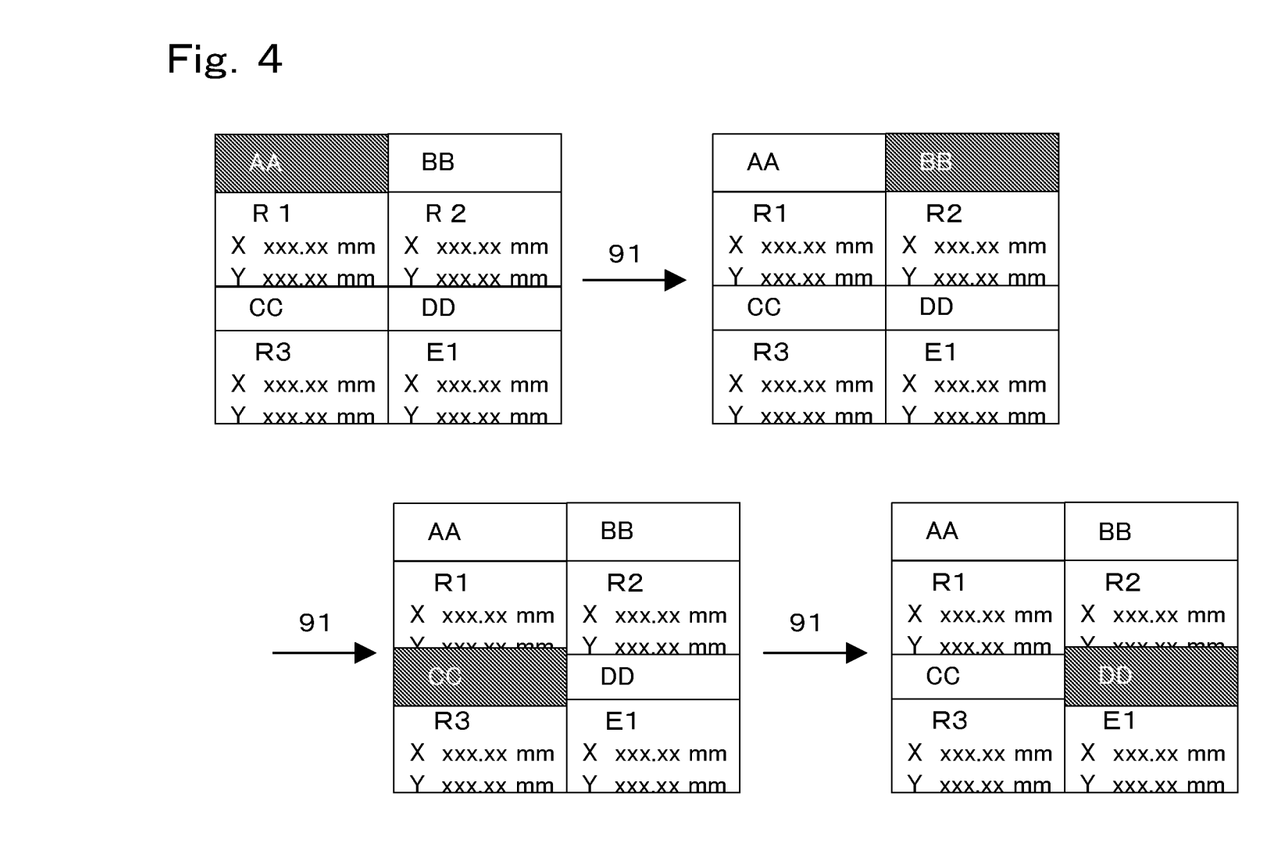
FIG. 4 illustrates a method for an active change using a keypad according to an embodiment of the present invention.
Figure 5:
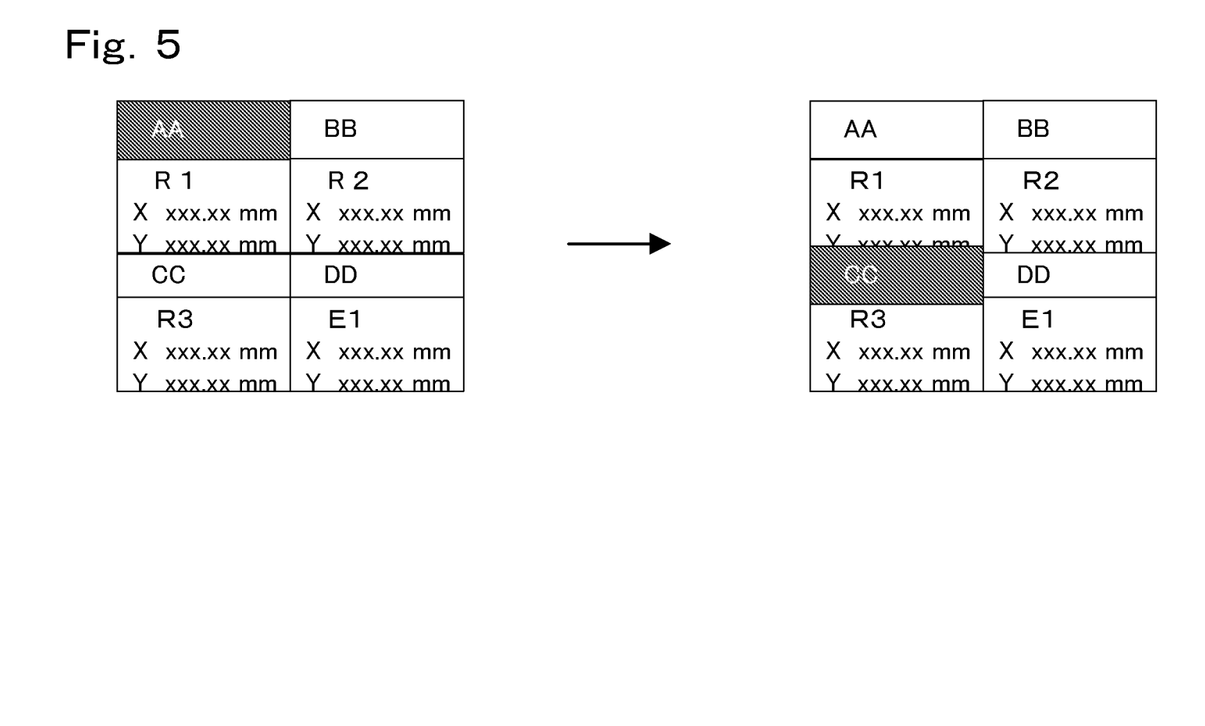
FIG. 5 illustrates a method for an active change using a touch panel according to an embodiment of the present invention.

In the all-purpose area 73, the screen of the function selected from the list of the functions of the category that the operator has selected in the menu area 71 is displayed. As usual, as shown in FIG. 3A, the all-purpose area 73 is displayed in an undivided mode, i.e., not divided into sub-areas. If the operator selects a menu for dividing the screen from the functions of the screen-setting category in the menu area 71, the all-purpose area 73 is displayed in a divided mode, i.e., divided into sub-areas. This menu provides patterns of dividing the all-purpose area 73 into a plurality of sub-areas. If the operator selects a preferred pattern, the all-purpose area 73 is divided in accordance with the selected pattern. If the operator selects a menu, screens that the operator prefers are independently displayed in the respective sub-areas of the all-purpose area 73. The operator selects a screen that the operator wants to edit in the divided all-purpose area 73. A method for selecting the screen is pressing an active screen change key 91 included in the keypad 9 of the robot teaching device 6 shown in FIG. 1 so as to change an active screen to be edited in such a manner that the active screen changes from "AA" setting to "BB" setting, "CC" setting and then "DD" setting in order as shown in FIG. 4. Another method for selecting the screen is touching and directly designating the sub-area of the all-purpose area 73 in which the screen to be edited is displayed in such a manner that the active screen changes from the "AA" setting to the "CC" setting as shown in FIG. 5. The screen selected using each of the above methods is highlighted compared with other screens (hereafter, the selected screen and the other screens are called the active screen and non-active screens, respectively. The operation of changing the active screen using the active screen change key or the touch panel is called the active change).

As shown in FIG. 5, the screens of the "AA" to "DD" settings are displayed in the respective four sub-areas shown in the all-purpose area 73. For example, the "AA" setting is a screen for setting the origin of each of the control groups. The "BB" setting is a screen for displaying a current position of each of the control groups. The "CC" setting is a screen for displaying control parameters such as a velocity gain, a position gain and so on of each of the control groups. The "DD" setting is a screen for displaying operation parameters such as inertia, a weight and so on of each of the control groups.

The "AA" setting is the active screen by default. A change in a value included in the "AA" setting will be explained. The position of the origin of a robot 1 is shown in the screen of the "AA" setting. As the screen of the "AA" setting is the active screen, the position of the origin can be changed. In order to change the position of the origin of a robot 2, the operator presses a page change key of the robot teaching device 6 shown in FIG. 1 or selects an operation key shown in the all-purpose area 73 shown in FIG. 2. Then, the position of the origin of the robot 2 can be changed. If the position of the origin of the robot 2 is shown, the position of the origin can be changed. As described above, the operator can change an object to be operated and a value shown in the active screen using the page change key or the operation key.

The screen of the "BB", "CC" or the "DD" setting can be made the active screen similar to the screen of the "AA" setting as described above, and the operator can change an object to be operated and a value shown in the active screen using the page change key or the operation key.

Figure 6:
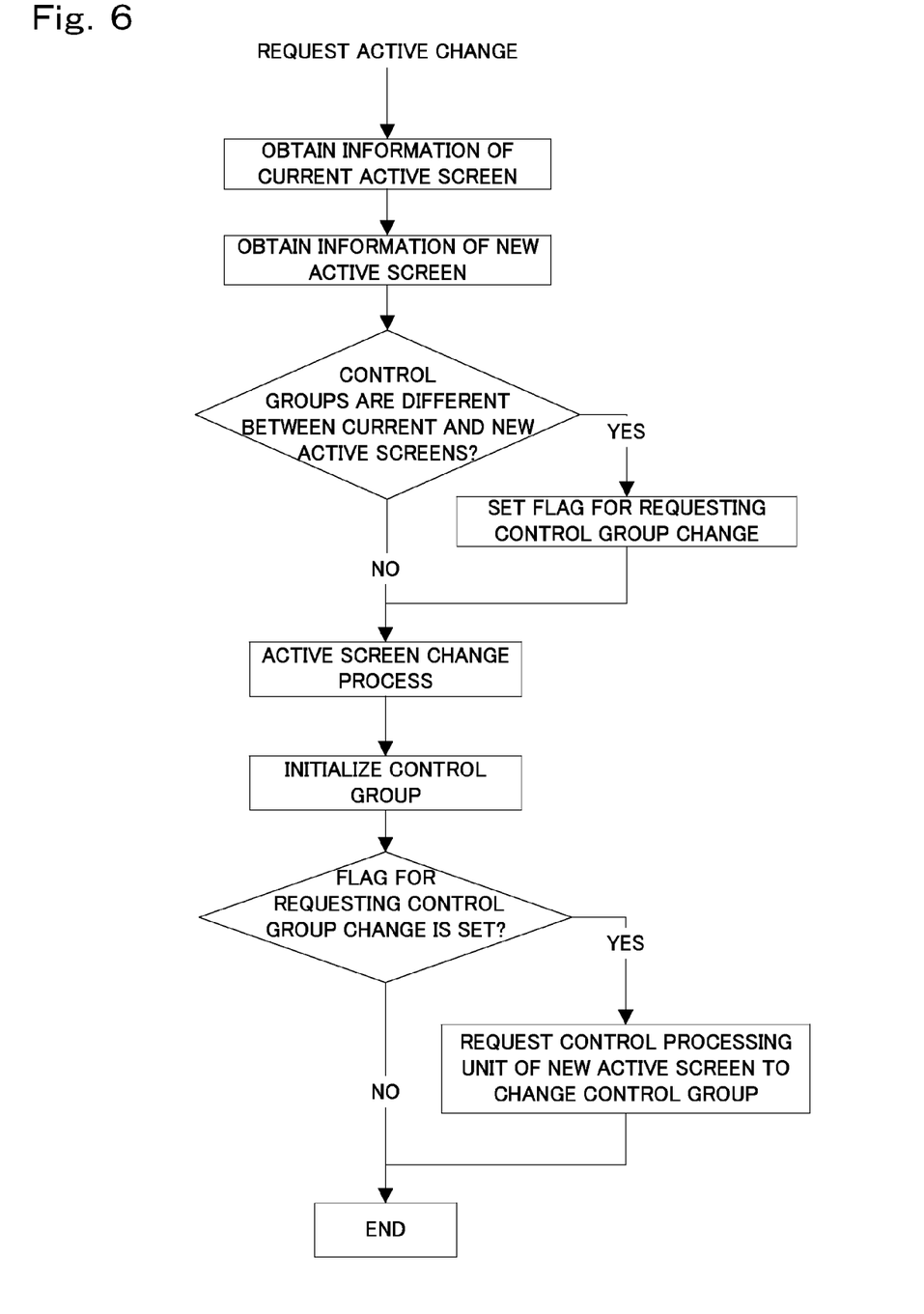
FIG. 6 is a flowchart illustrating processing of an all-purpose area display processing unit according to an embodiment of the present invention.

A relation between the active screen change process and an operation of the control unit 2 of the robot control device 1 will be explained with reference to FIG. 6.

If an operator performs an active change using the active screen change key 91, a signal of the key is sent to the control unit 2 of the robot control device 1 via the communication units 3 and 8 shown in FIG. 1. If the operator performs an active change using the touch panel, the robot teaching device 6 detects which portion has been touched in the all-purpose area 73, determines which one of the screens shown in the divided sub-areas has been requested in accordance with the coordinates of the touched portion, and notifies the robot control device 1 of the determined result.

The control unit 2 of the robot control device 1 detects the state of the active change of the robot teaching device 6, and gives corresponding portions instructions. If an active change is requested, the control unit 2 of the robot control device 1 supplies an instruction to an all-purpose area display processing unit included in the control unit 2 and configured to perform a display control process of the all-purpose area 73. Upon receiving the above instructions, the all-purpose area display processing unit changes the active screen.

In order to perform an active change, the control unit 2 obtains information with respect to the current active screen and which one of the control groups 5 should be selected for the next screen, i.e., content of the screen set to be active next, for a control processing unit of each of the two screens. That is, for example, a case where the current active screen shows a setting of the robot 1 and the screen set to be active next shows a setting of the robot 2.

If the provided settings of the control groups for the two screens are compared with each other and are different from each other, the control group 5 needs to be changed to the one to be selected on the new active screen. Thus, the control unit 2 sets a flag for requesting a control group change in a process program in the control processing unit.

As described above, the robot teaching device 6 requests the robot control device 1 to change the active screen, and the control unit 2 compares the display states of the current and next active screens with each other. After the control unit 2 sets a flag for requesting a control group change as necessary, the all-purpose area display processing unit performs the active screen change process. After the active screen change process is performed, the active screen is changed to the new one that has been requested.

Figure 7:
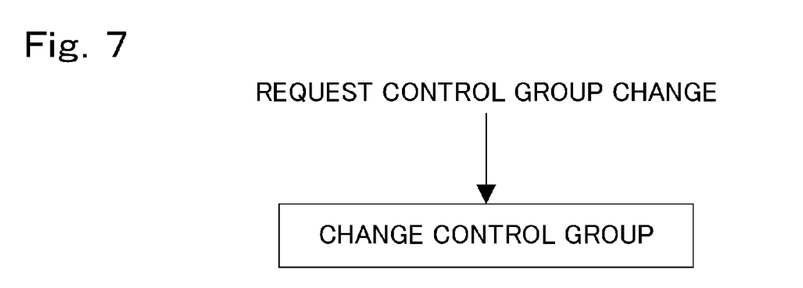
FIG. 7 is a flowchart of a new active screen according to an embodiment of the present invention.

Upon the active screen being changed to the new one, the control unit 2 of the robot control device 1 detects a state of the flag for requesting a control group change. If the flag is set, the control unit 2 requests the control processing unit that controls the operation of the new active screen to change the control group. Upon being requested, the control processing unit determines which one of the control groups the current control group should be changed to on the basis the data that the control processing unit displays at the moment, and changes the control group as shown in FIG. 7.

Although the control group 5 may be determined for a screen depending on the state of the screen, a screen for displaying data unrelated to the control group 5 may not uniquely determine which one of the control groups 5 should be selected as an object to be operated. If the control group 5 cannot be changed when such a screen is an active screen, the control group 5 to be operated varies depending on an order of the active screen change, which causes a safety problem. Accordingly, if the active screen is changed, using any of the above methods, the state of selecting the control group 5 returns to the initial state once. As a result, if the active screen is unrelated to the control group 5, the state of selecting the control group 5 can be unified to the initial state. Thus, if a control group change is requested after the control group 5 to be operated is initialized, the control group 5 can be properly changed only on a screen related to the control group 5.

What is claimed is:

1. A robot system, comprising:
    a plurality of robots each having a first parameter and a second parameter, the first parameters of the robots having a parameter type same as one another, the second parameters of the robots having a parameter type same as one another and different from the parameter type of the first parameters;
    a robot teaching device configured to teach and operate the robots, the robot teaching device including a display and an operation device, the display being configured to display the first parameter corresponding to one of the robots, the operation device being configured to be operated by an operator to change the first parameter displayed in the display from the first parameter corresponding to one of the robots to the first parameter corresponding to another of the robots, the operation device being configured to be operated by the operator to change a value of the first parameter displayed in the display; and
    a robot control device connected to the robots and the robot teaching device, the robot control device being configured to control the robots based on the first parameters, the robot control device selecting, if the operating device is operated by the operator to change the first parameter displayed in the display from the first parameter corresponding to one of the robots to the first parameter of another of the robots, a robot corresponding to the first parameter newly displayed in the display from among the robots as an operational object,
    wherein the robot control device is configured to control the robots based on the second parameters,
    wherein the display includes an all-purpose area including a first sub-area and a second sub-area, the first sub-area being configured to display the first parameter of one of the robots, the second sub-area being configured to display the second parameter of one of the robots,
    wherein the operation device is configured to be operated by the operator to select an active area from among the first and second sub-areas,
    wherein the robot control device is configured to detect the active area selected by the operator using the operation device,
    wherein the robot control device compares a robot corresponding to the first parameter displayed in the first sub-area with a robot corresponding to the second parameter displayed in the second sub-area if the active area is changed from the second sub-area to the first sub-area, and
    wherein the robot control device changes the operational object from the robot corresponding to the second parameter displayed in the second sub-area to the robot corresponding to the first parameter displayed in the first sub-area if the robot corresponding to the first parameter displayed in the first sub-area is different from the robot corresponding to the second parameter displayed in the second sub-area.

2. The robot system according to claim 1, wherein the operation device is configured to be operated by the operator to change the first parameter displayed in the first sub-area from the first parameter corresponding to one of the robots to the first parameter corresponding to another of the robots, and is configured to be operated by the operator to change the second parameter displayed in the second sub-area from the second parameter corresponding to one of the robots to the second parameter corresponding to another of the robots.

3. The robot system according to claim 1, wherein the robot control device selects, if the operation device is operated by the operator to change the first parameter displayed in the first sub-area from the first parameter corresponding to one of the robots to the first parameter corresponding to another of the robots when the first sub-area is being selected as the active area, a robot corresponding to the first parameter newly displayed in the first sub-area from among the robots as the operational object.

4. The robot system according to claim 3, wherein the robot control device selects, if the operation device is operated by the operator to change the second parameter displayed in the second sub-area from the second parameter corresponding to one of the robots to the second parameter corresponding to another of the robots when the second sub-area is being selected as the active area, a robot corresponding to the second parameter newly displayed in the second sub-area from among the robots as the operational object.

5. The robot system according to claim 1,
    wherein the robot control device compares a robot corresponding to the second parameter displayed in the second sub-area with a robot corresponding to the first parameter displayed in the first sub-area if the active area is changed from the first sub-area to the second sub-area, and
    wherein the robot control device changes the operational object from the robot corresponding to the first parameter displayed in the first sub-area to the robot corresponding to the second parameter displayed in the second sub-area if the robot corresponding to the second parameter displayed in the second sub-area is different from the robot corresponding to the first parameter displayed in the first sub-area.

6. The robot system according to claim 5,
    wherein the operation device is configured to be operated by the operator to change a value of the first parameter displayed in the first sub-area, and
    wherein the operation device is configured to be operated by the operator to change a value of the second parameter displayed in the second sub-area.

7. The robot system according to claim 1,
    wherein the first parameter includes at least one of
        an original position,
        a current position,
        a velocity gain,
        a position gain,
        an inertia, and
        a weight.

8. The robot system according to claim 7,
    wherein the second parameter includes at least one of an original position,
a current position,
a velocity gain,
a position gain,
an inertia, and
a weight.

9. The robot system according to claim 1, wherein the display includes a menu area configured to display a list of functions necessary to teach the robots.

10. The robot system according to claim 9,
   wherein the menu area is elongated in a longitudinal direction of the robot teaching device, and
   wherein the all-purpose area is adjacent to the menu area in a direction perpendicular to the longitudinal direction on the display.

11. The robot system according to claim 1, further comprising:
   a plurality of external axes configured to work in cooperation with the robots,
   wherein the robot teaching device is configured to teach and operate the robots and the external axes, and
   wherein the robot control device is connected to the robots, the external axes, and the robot teaching device, and is configured to control the robots and the external axes.

* * * * *